June 25, 1935.　　　W. C. BUTTNER　　　2,005,931

SAFETY VALVE

Filed July 8, 1933

INVENTOR
William C. Buttner
BY
Wm. O. Bell
ATTORNEY

Patented June 25, 1935

2,005,931

UNITED STATES PATENT OFFICE 2,005,931

SAFETY VALVE

William C. Buttner, Chicago, Ill., assignor to The Bastian-Blessing Company, Chicago, Ill., a corporation of Illinois Application July 8, 1933, Serial No. 679,542

2 Claims. (Cl. 277—55)

This invention relates to safety valves of the kind particularly adapted for use with gas tanks affording a source of supply of gas for heating purposes and the like in homes, restaurants and other places isolated from gas supply mains.

It has been the common practice heretofore to equip gas tanks of the above described type with a safety device in the form of a thin, frangible, metallic disc which was adapted to break when the pressure in the tank was increased abnormally as in the case of a fire or other condition which would raise the pressure in the tank in such an amount that there was danger of the tank bursting. The use of such discs, however, has proved to be objectionable for the reason that they might be perforated in handling and use of the containers or due to defects in the metal the disc might break upon being subjected to a pressure far below that at which the disc was intended to break and it might sometimes happen that the disc would be defective so that it would not break when subjected to the pressure at which it was adapted to break. It is therefore the salient object of my invention to relieve the pressure in a gas tank or the like when it is raised to a predetermined point to thereby prevent bursting of the tank or other objectionable or dangerous condition.

It has been found that safety valves of conventional design are not adapted for use in connection with gas tanks for the reason that they do not afford proper discharge and instead of opening and remaining open to permit the gas to escape, valves of conventional design have been found to open and close rapidly with an action very much like that of a pneumatic hammer and this action often resulted in complete destruction of the valve or in the disfiguration of the valve seat to such an extent that the valve remained open. Hence, another object is to provide a relief valve which will open at a predetermined pressure and which will remain open until the pressure has been reduced well below that at which the valve opens and which will thereupon close and remain closed until the pressure again reaches the predetermined amount.

Further objects are to maintain atmospheric pressure on the outlet side of the valve member so as to insure normal functioning thereof; to employ a collapsible spring for maintaining the valve member against the valve seat until the valve seat is subjected to a predetermined pressure and to so form the spring that it will be compressed with the convolutions thereof in abutting relation to thereby afford a stop for the valve when it is open; to so guide the valve member in its opening and closing movements that binding thereof is prevented; to afford ample discharge area for the gas so as to insure rapid exhaust to thereby quickly relieve the excessive pressure; to provide a chamber in the valve into which the escaping gas flows and collects in such a manner as to hold the valve in open position until the pressure has been reduced to a point well below that at which the valve is opened; and to provide a safety valve of simple and economical construction and efficient and positive operation.

Selected embodiments of the invention are illustrated in the accompanying drawing wherein Fig. 1 is a vertical sectional view showing the valve closed;

Figure 1:
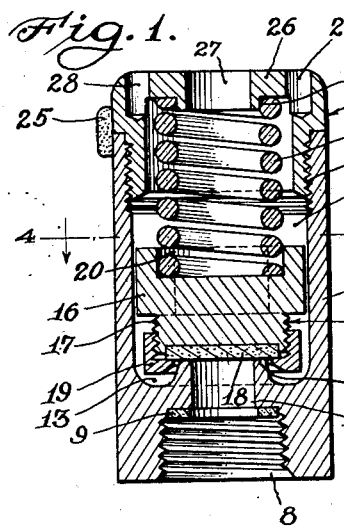

In the form of the invention illustrated in Figs. 1 to 4, inclusive, the valve includes a body 7 having a tapped opening 8 at the lower end thereof adapted to be fitted onto a threaded pipe or boss, the end of which is adapted to abut against the washer 9 to provide a tight joint. A passage 10 leads from the tapped opening 8 and terminates in a valve seat 11. The body 7 has a chamber 12 therein in which the operative parts of the valve are mounted and the body is recessed at the end thereof adjacent the valve seat 11 to provide a pocket 13 forming an extension of the chamber 12.

The valve member 14 includes a polygonal head 16 (Fig. 4), the apices of which are adapted to ride on the wall of the chamber 12 thereby affording line contact with the chamber wall to reduce friction and prevent binding of the valve member during the opening and closing movements thereof. A threaded boss 17 depends from the polygonal head 16. A valve disc 18 is mounted on the lower end of the threaded boss 17 and is retained in position by the nut 19 fitted onto the threaded boss. When the valve is closed, the disc 18 rests on the valve seat 11.

A recess 20 is provided in the upper face of the polygonal head 16 and the lower end of a spring 21 is seated therein. The spring 21 is preferably wound evenly so that the convolutions thereof regularly lie one above the other. The outer end of the wall of the chamber 12 is threaded as at 22 to receive the nut 23 which includes a shoulder 24 that is fitted into the outer end of the spring 21, and the nut 23 serves to hold he spring 21 in position. A drop of solder 25 or other suitable means is employed to prevent loosening of the nut 23. The head 26 of the nut 23 closes the chamber 12 and has a medially located opening 27 therein. A plurality of openings 28 are formed in the head 26 in concentric relation about the opening 27 and communicate with the chamber 12. The opening 27 communicates with the area enclosed by the spring 21.

Figure 2:
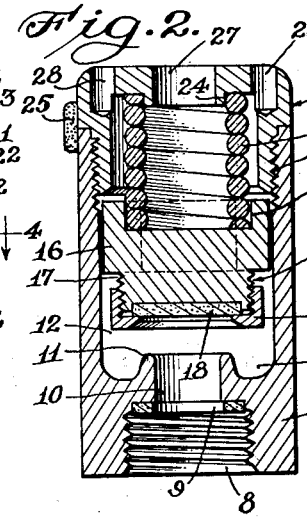
Fig. 2 is a view, similar to Fig. 1, showing the valve open.
Figure 3:
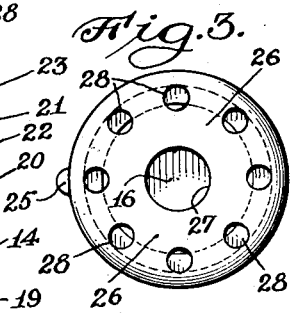
Fig. 3 is a top plan view.
Figure 4:
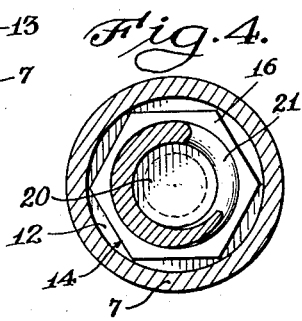
Fig. 4 is a horizontal sectional view taken on the line 4—4 on Fig. 1.

When the pressure in the device with which the valve is connected reaches a predetermined point whereby sufficient pressure is impressed on the valve disc 18 to overcome the effect of the spring 21, the valve disc 18 disengages the valve seat 11 and the gas or the like flows through the passage 10 into the pocket 13 and thereupon pressure is built up in the chamber 12 which acts on the underside of the polygonal head 16 and the valve disc to force the valve member 14 into wide open position illustrated in Fig. 2. Ample space is provided for the escape of gas between the chamber wall and the flat sides of the polygonal head 16, and the gas flows past these flat sides and out through the openings 28. When the valve is in wide open position, as shown in Fig. 2, the convolutions of the spring 21 are tightly compressed against one another and thereby afford a stop to limit further opening of the valve member 14. Until the time the convolutions of the spring 21 are tightly compressed, a part of the gas flows therebetween and out through the opening 27. However, when the convolutions of the spring 21 are tightly engaged, as illustrated in Fig. 2, the escape of the gas is through the openings 28 and the aggregate cross sectional area of these openings 28 is greater than the cross sectional area of the passage 10 which insures ample area for discharge of the gas. The space between the wall of the chamber and the sides of the hexagonal head 16 is likewise greater than the cross sectional area of the passage 10 so as to afford unrestricted passage for escape of the gas or the like.

When the convolutions 21 are tightly engaged one with the other, as shown in Fig. 2, back pressure on the valve member is prevented since the area enclosed by the spring is in communication with the atmosphere through the opening 27. This prevents improper operation of the valve, that is to say, premature closing or unduly prolonged opening of the valve, and it likewise prevents rapid repeated opening and closing of the valve.

Figure 5:
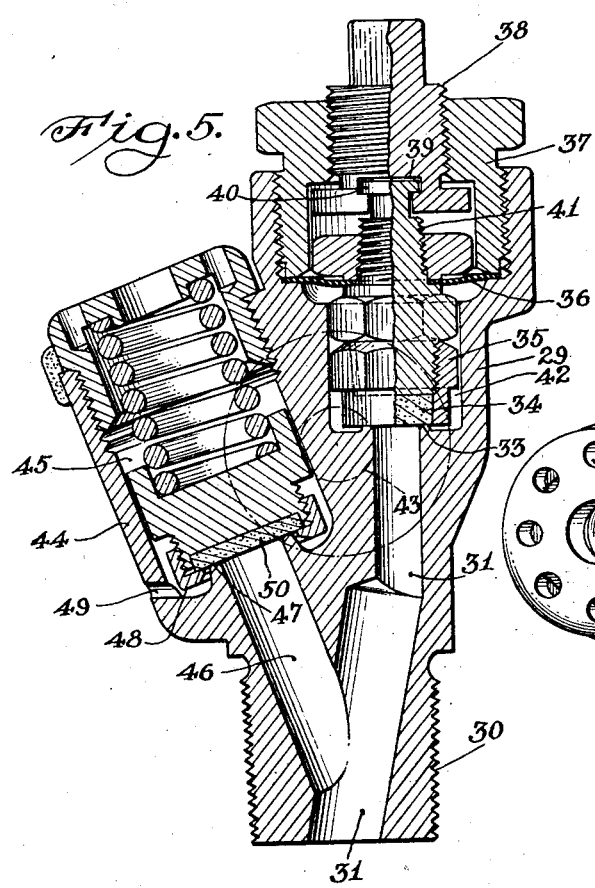
Fig. 5 is a vertical sectional view showing the safety valve incorporated in a typical gas tank valve.
Figure 6:
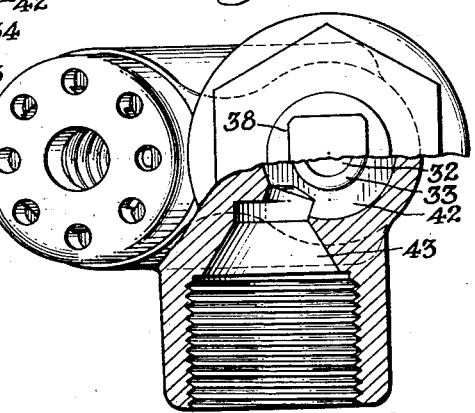
Fig. 6 is a top plan view, in which certain parts are broken away, of the valve shown in Fig. 5.

This invention is particularly adapted for use with gas tanks such as are commonly employed to supply gas for heating purposes or the like and such tanks are provided with a valve which may be opened so as to release the supply of gas contained therein. A valve of this general type is illustrated in Figs. 5 and 6 and the valve therein illustrated includes a body 29 having a threaded end 30 adapted to be fitted in a tapped opening at the end of a standard gas tank. A bore 31 leads from the free end of the boss 30 to a passage 32 in the body 29 which terminates in a valve seat 33 adapted to be engaged by a valve disc 34 carried in the valve member 35 connected to a flexible diaphragm 36 held in position by a nut 37 fitted into a tapped opening in the body 29. A threaded plug 38 is fitted in a centrally located opening in the nut 37 and includes a socket 39 adapted to receive the head 40 on the connector 41 secured to the diaphragm 36. A chamber 42 is formed about the valve seat 33 and an outlet passage 43 (Fig. 6) leads therefrom. By rotating the threaded plug 38, it is caused to move inwardly or outwardly of the nut 37 and this movement is transmitted through the connector 41 to flex the diaphragm 36 and when the diaphragm is flexed outwardly, the valve disc 34 is disengaged from the valve seat 33 whereupon gas from the tank flows through the bore 31, passage 32 into the chamber 42 and out through the outlet passage 43.

My safety valve may be expeditiously incorporated in a valve of the above described type and this is illustrated in Fig. 5 wherein it is shown that the body 29 is provided with a boss 44 providing a chamber 45 similar to the chamber 12. A passage 46 leads from the bore 31 to a valve seat 47 similar to the valve seat 11 and a pocket 48, similar to the pocket 13, is provided about this valve seat. An opening 49 leads from the pocket 48 and such an opening is commonly known in the art as a weep hole. The parts mounted in the chamber 45 are similar to the parts mounted in the chamber 12 and function in a similar manner so that the valve disc 50 is moved toward and away from the valve seat 47 in accordance with the pressure in the tank on which the safety valve is mounted.

An important advantage of the safety valve of my invention is that it does not open until the pressure on the valve disc engaging the valve seat reaches a predetermined amount and thereupon the valve disc is disengaged from the valve seat and then, as explained, the pressure of the escaping gas opens the valve wide, into the position illustrated in Fig. 2. The valve remains in this wide open position until a quantity of gas escapes sufficient to reduce the pressure in the tank or the like with which the valve is associated so that the pressure impressed upon the valve disc and the hexagonal head of the valve member is so reduced that the spring overcomes this pressure and re-closes the valve by again tightly engaging the valve disc with the valve seat. This will occur when the pressure has been materially reduced below that which effects disengagement of the valve disc from the valve seat. By way of example, if a pressure of four hundred and fifty pounds is adapted to disengage the valve disc from the valve seat, the valve will not re-close until the pressure within the tank or the like has been reduced to three hundred pounds. It is to be understood that the foregoing is merely exemplary for the valve may be adapted to open at any desired pressure and may be arranged to close at any desired pressure and it is further to be understood that the foregoing example is merely illustrative as to the relative proportions of the opening and closing pressures.

The valve of this invention may be economically and expeditiously manufactured and it may be incorporated either directly in another valve body, as shown in Fig. 5, or it may be made as a separate instrumentality adapted to be attached in a well understood manner to a tank, pressure system, or the like.

While I have illustrated and described preferred forms of my safety valve, it is to be understood that these are capable of variation and modification and I therefore do not wish to be limited to the precise details set forth but desire to avail myself of such changes and alterations as fall within the purview of the following claims.

I claim:

1. In a safety valve of the class described, a body having a chamber therein, a valve seat at one end of said chamber, said body having an inlet passage opening through said valve seat and adapted to communicate with a fluid container, a polygonal valve member in said chamber and engageable with said valve seat, the apices at the junctures at the sides of said valve member engaging the wall of the chamber in line contact to guide the valve member in movement thereof toward and away from the valve seat, a cap having a depending hollow boss screw-threaded into the outer end of said chamber to be tightly retained in position, and a spring extending into said hollow boss and urging said valve member into engagement with said valve seat and adapted to yield when a predetermined pressure is impressed on the valve member to permit disengagement of the valve member from the valve seat and escape of fluid from the container, the sides of said valve member being spaced from the wall of said chamber sufficiently to afford a passage through said chamber about said valve member of a cross-sectional area at least equal to the cross-sectional area of said inlet passage, the convolutions of said spring being adapted to engage one another to limit the movement of said valve member away from said valve seat, the inner end of the boss on said cap being beveled so that when the convolutions of said spring engage one another the passage between said boss and said valve member will be at least equal to the cross-sectional area of said inlet passage, said cap having a plurality of openings therein of an aggregate size at least equal to the cross-sectional area of said inlet passage and having another opening therein communicating with the interior of said spring to vent the interior of said spring to the atmosphere when the convolutions of the spring engage one another.

2. In a valve which has a body having a part adapted for connection with a member containing gas under pressure, said body having an inlet passage and an outlet passage therein, valve means controlling communication between said passages, the combination therewith of an angularly extending boss on said body and having the outer end thereof arranged close to the adjacent part of the body, said boss and said body having a bore extending thereinto from the outer end of said boss, a valve seat at the lower end of said bore, said body having a passage therein leading from said inlet passage to said valve seat, a valve member in said bore, a spring in said bore and urging said valve member into engagement with said valve seat, and a cap at the outer end of said boss and secured thereto and tensioning said spring, said cap having openings therein to permit the escape of gas when the valve member disengages the valve seat, said body being cut away to receive a part of the cap whereby said cap may be arranged on the outer end of said boss in close association with said body.

WILLIAM C. BUTTNER.